(12) United States Patent
Wu et al.

(10) Patent No.: US 9,281,007 B2
(45) Date of Patent: Mar. 8, 2016

(54) READ CHANNEL SAMPLING UTILIZING TWO QUANTIZATION MODULES FOR INCREASED SAMPLE BIT WIDTH

(71) Applicant: LSI Corporation, San Jose, CA (US)

(72) Inventors: Xuebin Wu, San Jose, CA (US); Yang Han, Sunnyvale, CA (US); Weijun Tan, Longmont, CO (US); Shaohua Yang, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 52 days.

(21) Appl. No.: 14/198,008

(22) Filed: Mar. 5, 2014

(65) Prior Publication Data

US 2015/0228303 A1 Aug. 13, 2015

Related U.S. Application Data

(60) Provisional application No. 61/937,234, filed on Feb. 7, 2014.

(51) Int. Cl.
| | |
|---|---|
| *G11B 20/10* | (2006.01) |
| *G11B 20/14* | (2006.01) |
| *G11B 5/55* | (2006.01) |
| *G11B 5/012* | (2006.01) |
| *G10L 19/02* | (2013.01) |

(52) U.S. Cl.
CPC .......... *G11B 20/10046* (2013.01); *G11B 5/012* (2013.01); *G11B 5/5526* (2013.01); *G11B 20/10009* (2013.01); *G11B 20/10268* (2013.01); *G11B 20/1403* (2013.01); *G10L 19/0208* (2013.01); *G11B 5/553* (2013.01)

(58) Field of Classification Search
CPC ............. G11B 20/10046; G11B 5/012; G11B 20/1403; G11B 5/5526; G11B 5/553; G11B 20/10009; G11B 20/10268; G10L 19/0208; H04L 27/06; H04L 27/02; H04L 27/206; H04N 5/44; H04N 5/211; H03M 3/50; H03M 7/3028
USPC ............ 360/39, 65, 32, 51; 348/614, 21, 607; 375/298; 341/51
See application file for complete search history.

(56) References Cited

U.S. PATENT DOCUMENTS

| | | | |
|---|---|---|---|
| 6,078,444 A | 6/2000 | Vishakhadatta et al. | |
| 6,246,345 B1 * | 6/2001 | Davidson et al. | ............... 341/51 |
| 2013/0021689 A1 | 1/2013 | Haratsch et al. | |

\* cited by examiner

*Primary Examiner* — Ali Neyzari

(57) ABSTRACT

A communication channel structure and a decoding method supported by such a communication channel structure are disclosed. Such a communication channel includes a digital filter configured for filtering an input signal and two quantizer configured for quantizing the filtered signal. A first quantizer is utilized to quantize the filtered signal to produce a first quantized sample having a first precision and a second quantizer is utilized to quantize the filtered signal to produce a second quantized sample having a second precision, wherein the second precision is different from the first precision. The communication channel also includes an iterative decoder configured for utilizing the first quantized sample for a first global iteration of a decoding process and utilizing the second quantized sample for at least one subsequent global iteration of the decoding process.

20 Claims, 2 Drawing Sheets

READ CHANNEL SAMPLING UTILIZING TWO QUANTIZATION MODULES FOR INCREASED SAMPLE BIT WIDTH

CROSS-REFERENCE TO RELATED APPLICATIONS

The present application claims the benefit under 35 U.S.C. §119(e) of U.S. Provisional Application Ser. No. 61/937,234, filed Feb. 7, 2014. Said U.S. Provisional Application Ser. No. 61/937,234 is hereby incorporated by reference in its entirety.

TECHNICAL FIELD

The present invention relates to the field of signal processing and particularly to a communication channel structure.

BACKGROUND

A read channel is an electrical circuit that transforms the physical magnetic flux changes into data bits. A read channel is utilized in various computer storage devices such a hard disks and the like.

SUMMARY

Accordingly, an embodiment of the present disclosure is directed to a communication channel. The communication channel includes a digital filter configured for filtering an input signal and a first quantizer configured for quantizing the filtered signal to produce a first quantized sample having a first precision. The communication channel also includes a second quantizer configured for quantizing the filtered signal to produce a second quantized sample having a second precision, wherein the second precision is different from the first precision. The communication channel further includes an iterative decoder configured for utilizing the first quantized sample for a first global iteration of a decoding process and utilizing the second quantized sample for at least one subsequent global iteration of the decoding process.

A further embodiment of the present disclosure is directed to a storage system. The storage system includes at least one storage device and a communication channel in communication with the at least one storage device. The communication channel further includes a digital filter configured for filtering an input signal and a first quantizer configured for quantizing the filtered signal to produce a first quantized sample having a first precision. The communication channel also includes a second quantizer configured for quantizing the filtered signal to produce a second quantized sample having a second precision, wherein the second precision is different from the first precision. The communication channel further includes an iterative decoder configured for utilizing the first quantized sample for a first global iteration of a decoding process and utilizing the second quantized sample for at least one subsequent global iteration of the decoding process.

An additional embodiment of the present disclosure is directed to an iterative detection decoding method. The method includes: filtering an input signal utilizing a digital filter; quantizing the filtered signal utilizing a first quantizer having a first precision to produce a first quantized sample; quantizing the filtered signal utilizing a second quantizer having a second precision to produce a second quantized sample, wherein the second precision is different from the first precision; utilizing the first quantized sample for a first global iteration of the iterative detection; and utilizing the second quantized sample for at least one subsequent global iteration of the iterative detection.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
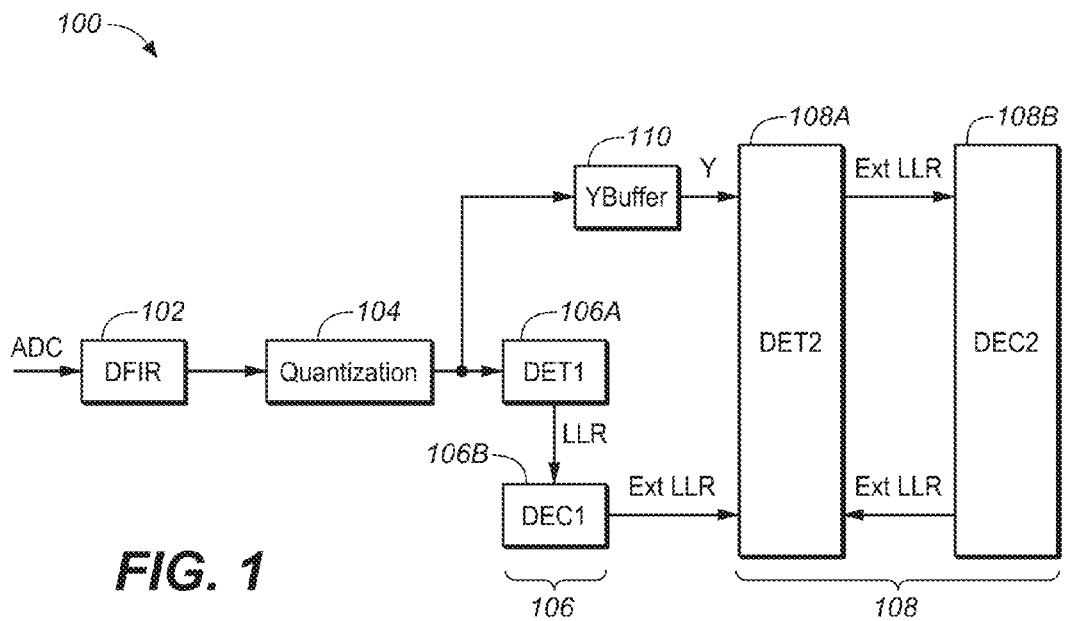
FIG. 1 is a block diagram depicting a read channel for reading input signals.

FIG. 1 shows a block diagram of a read channel 100 for reading input signals. The received signal, if still in analog form, is converted to digital form through analog-to-digital conversion (ADC). The converted signal is then provided to a digital filter 102 that conditions the signal. In some embodiments, filter 102 includes a digital finite impulse response (DFIR) filter. Other signal conditioning modules, such as decision feedback equalization (DFE) and/or feed forward equalization (FFE), can also be utilized. The filtered sample values (referred to as "Y-samples") are then quantized by the quantizer 104 and provided to the first decoding iteration 106 and subsequently to other decoding iterations 108 via Y-sample buffer 110 for further processing.

In certain embodiments, each decoding iteration is processed utilizing a detector (denoted as "DET") and a decoder (denoted as "DEC") jointly referred to as an iterative decoder. The detectors can be implemented as soft-output Viterbi detectors, maximum a posteriori (MAP) detectors or the like, and the decoders can be implemented as Low Density Parity Check (LDPC) decoders, Turbo decoders or the like. Log-likelihood ratios (LLRs) are probability measures for detected bits that are computed by the detectors and the decoders. The LLRs are calculated based on provided Y-samples as well as any previously calculated LLRs if available. For example, as shown in FIG. 1, in the first global iteration, detector 106A provides its determined LLRs to decoder 106b, and decoder 106b provides its determined LLRs to the detector of a subsequent global iteration, namely detector 108A in this example. Detector 108A then provides its determined LLRs to decoder 108b, and the decoder 106b provides its determined LLRs back to the detector 108A, and the iterative process continues.

It is noted that the iterative decoders 106 and 108 are depicted as separate blocks in FIG. 1 for illustrative purposes to distinguish the first decoding iteration from subsequent decoding iteration(s). While in certain embodiments, the iterative decoders 106 and 108 can be configured as separate components, it is contemplated that the first decoding iteration and the subsequent decoding iteration(s) can also be carried out on the same hardware components on the read channel circuit without departing from the spirit and scope of the present disclosure.

It is also noted that the filtered sample values (referred to as "Y-samples") are quantized by the quantizer 104 prior to the decoding process. Quantization in digital signal processing is the process of mapping a large set of input values to a smaller set to some unit of precision. In analog-to-digital conversion, the difference between the actual analog value and quantized digital value is called quantization error or quantization distortion. It has been observed that fixed point loss is an important factor that affects disk (e.g., hard drive or the like) read channel performance. Reducing quantization error of the Y sample (equalized sample) by increasing its bit width is helpful in reducing the fixed point loss and thus improving the read channel. However, simply increasing the Y sample bit-width has a high cost in chip area and buffer size.

It has also been observed that in reality, a sector generally converges in a few global iterations. It is noted that a better detector output is essential at the beginning of the decoding process (better detector output can reduce the average number global iterations), and read channel backend generally has more time to deal with bad sectors. Therefore, in accordance with embodiments of the present disclosure, a high precision Y sample is used in the first global iteration, and a lower precision Y sample is used in the subsequent global iterations. This allows the read channel to benefit from increased Y sample bit-width without having to change its buffer size or add to its cost and complexity.

Figure 2:
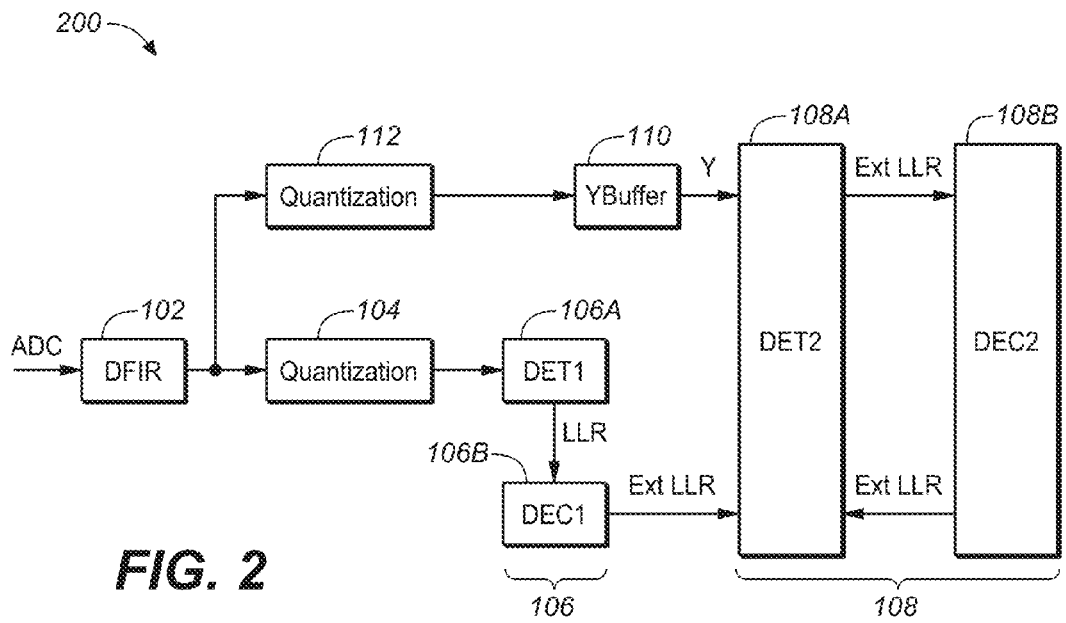
FIG. 2 is a block diagram depicting a read channel utilizing two quantization modules for increase sample bit width.

Referring to FIG. 2, a block diagram of a read channel 200 utilizing two quantization modules is shown. More specifically, the output of the filter 102 is quantized by two quantization modules 110 and 112 with different precisions. In the example depicted in FIG. 2, a first quantization module 110 having a first quantization precision is utilized to quantize the filtered samples for the first global iteration 106, and a second quantization module 112 having a second quantization precision is utilized to quantize the filtered samples for the subsequent global iterations 108 via Y-sample buffer 110. In accordance with embodiments of the present disclosure, the first quantization module 110 has a precision level that is higher than the second quantization module 112 in order to provide improved precision at the beginning of the decoding process (i.e., the first global iteration 106), but the output of the first quantization module 110 is not buffered in the Y-sample buffer 110. Instead, the output of the second quantization module 112 is buffered in the Y-sample buffer 110 and utilized for subsequent iterations 108.

Similar to the read channel structure described in FIG. 1, each decoding iteration in FIG. 2 is processed utilizing a detector and a decoder. The first global iteration uses detector 106A, decoder 106B and Y samples from the filter 102 directly through a higher precision quantizer 110. In the mean time, the Y samples are quantized using quantizer 112 and saved in Y-sample buffer 110. The second global iteration then uses detector 108A, decoder 108B, Y samples from the buffer 110 (with a lower precision) and external LLR from decoder 106B, and any subsequent global iteration will then use detector 108A, decoder 108B, Y samples from the buffer 110 and external LLR of from decoder 108B.

It contemplated that the detector 106A (DET1) is the module that is impacted the most utilizing the read channel structure shown in FIG. 2. Higher resolution Y samples will increase the complexity and latency of this detector. However, the impact is not significant if the bit precision is only increased by 1 or 2 bits. It is also contemplated that the second quantization module 112 can be of the same precision level as quantization module 104, for example, and therefore the size of the Y-sample buffer 110 does not need to be increased, and the area increase is also not significant even with the new quantization module 110 added.

It is further contemplated that the increase of the bit precision of the first quantization module 110 is not limited to 1 or 2 bits in comparison to that of the second quantization module 112. It is contemplated that greater bit precision increase may be utilized without departing from the spirit and scope of the present disclosure.

Figure 3:
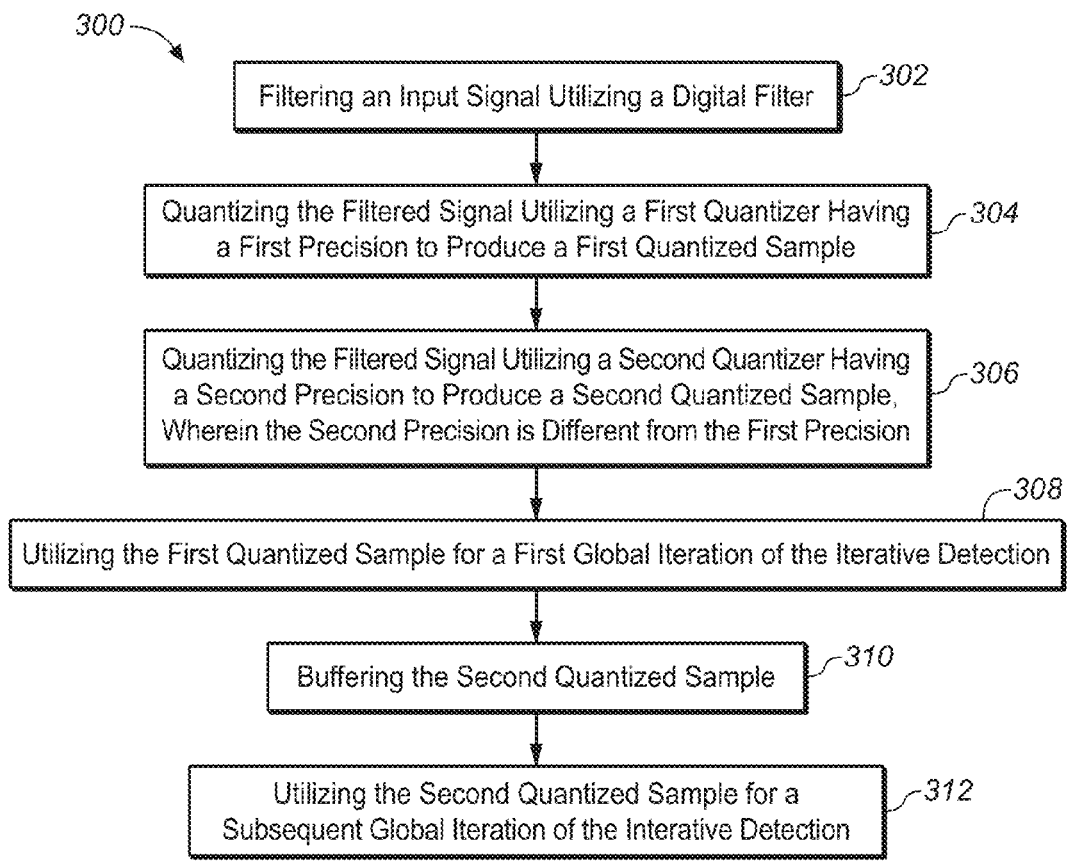
FIG. 3 is a flow diagram illustrating a read channel decoding method utilizing two quantization modules.

Referring now to FIG. 3, a flow diagram illustrating a read channel decoding method 300 utilizing two quantization modules is shown. As illustrated in FIG. 3, a digital filter is utilized to filter the input signal in step 302. The filtered signal is then quantized using a first quantizer having a first precision in step 304 and quantized using a second quantizer having a second precision in step 306, wherein the first precision is different from the second precision. As previously described, the output of the first quantizer is utilized as the input for the first global iteration of the iterative detection process in step 308, and the output of the second quantizer is buffered in a Y-sample buffer in step 310 and utilized for all subsequent iterations of the iterative detection process in step 312.

It is contemplated that the structures and decoding methods described above are applicable to various other types of communication systems in addition to read channel structures. For instance, the structures and decoding methods can be generally applied to communication systems that require equalization, such as wireless and/or wired communication systems and the like.

It is also contemplated that the structures and decoding methods described above can be utilized in a hard disk drive, a solid state drive, a hybrid drive, or a part of a higher level system, such as a RAID (redundant array of inexpensive storage devices or redundant array of independent storage devices) based storage system. Such a RAID storage system increases stability and reliability through redundancy, combining multiple storage devices as a logical unit. Data may be spread across a number of storage devices included in the RAID storage system according to a variety of algorithms and accessed by an operating system as if it were a single storage devices. For example, data may be mirrored to multiple storage devices in the RAID storage system, or may be sliced and distributed across multiple storage devices in a number of techniques. If a small number of storage devices in the RAID storage system fail or become unavailable, error correction techniques may be used to recreate the missing data based on the remaining portions of the data from the other storage devices in the RAID storage system. The storage devices in the RAID storage system may be, but are not limited to, individual storage systems such hard disk drives, solid state drives, hybrid drives or any combination of such drives, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

As mentioned previously, the storage device configuration can be varied in other embodiments of the invention. For example, the storage device may comprise a hybrid hard disk drive which includes a flash memory in addition to one or more storage disks. In addition, storage device may be coupled to or incorporated within a host processing device, which may be a computer, server, communication device, etc.

Figure 4:
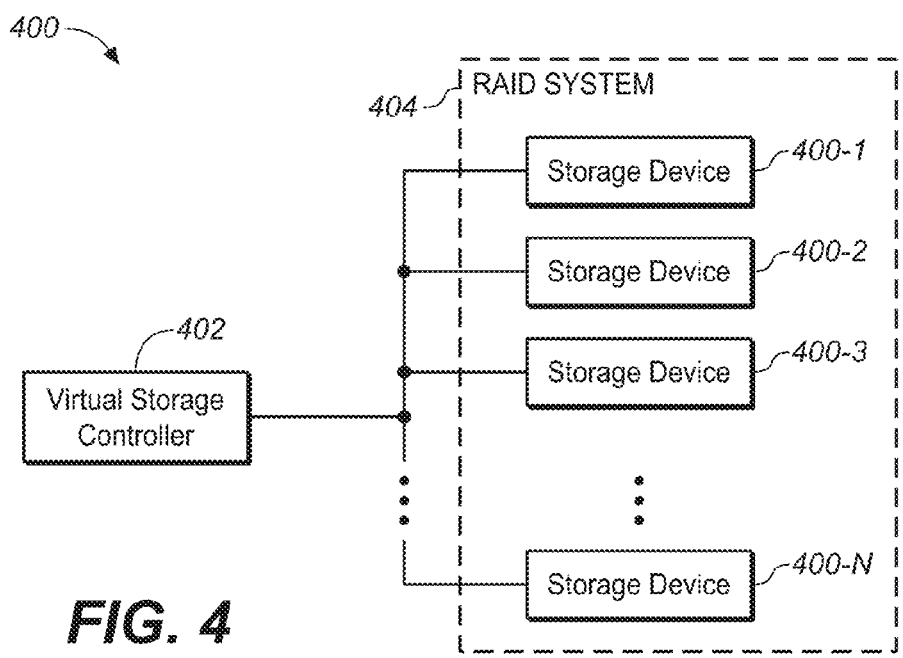
FIG. 4 is a block diagram depicting a storage system.

Furthermore, multiple storage devices 400-1 through 400-N possibly of various different types may be incorporated into a virtual storage system 400 as illustrated in FIG. 4. The virtual storage system 400, also referred to as a storage virtualization system, illustratively comprises a virtual storage controller 402 coupled to a RAID system 404. The RAID system more specifically comprises N distinct storage devices denoted 400-1, 400-2, . . . 400-N, one or more of which may be hard disk drives and one or more of which may be solid state drives. Furthermore, one or more of the hard disk drives of the RAID system are assumed to be configured to include read channel circuitry and associated decoding circuitry as disclosed herein. These and other virtual storage systems comprising hard disk drives or other storage devices are considered embodiments of the invention.

Embodiments of the invention may also be implemented in the form of integrated circuits. In a given such integrated circuit implementation, identical die are typically formed in a repeated pattern on a surface of a semiconductor wafer. Each die includes, for example, at least a portion of decoding circuitry as described herein, and may further include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

It should again be emphasized that the above-described embodiments of the invention are intended to be illustrative only. For example, other embodiments can use different types and arrangements of storage disks, read/write heads, read channel circuitry, signal processing circuitry, decoders, filters, detectors, and other storage device elements for implementing the described error correction functionality. Also, the particular manner in which certain steps are performed in the signal processing may vary. Further, although embodiments of the invention have been described with respect to storage disks such as hard disk drives, embodiments of the invention may be implemented various other devices including optical data-storage applications and wireless communications. These and numerous other alternative embodiments within the scope of the following claims will be apparent to those skilled in the art.

Furthermore, embodiments of the invention are applicable to any communication channel that employs low density parity check technology (LDPC). LDPC technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes, optical data-storage, and memory devices such as DRAM, NAND flash, NOR flash, other non-volatile memories, solid state drives, and hybrid drives.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A communication channel, comprising:
    a digital filter configured for filtering an input signal;
    a first quantizer configured for quantizing the filtered signal to produce a first quantized sample having a first precision;
    a second quantizer configured for quantizing the filtered signal to produce a second quantized sample having a second precision, wherein the second precision is different from the first precision; and
    an iterative decoder configured for utilizing the first quantized sample for a first global iteration of a decoding process and utilizing the second quantized sample for at least one subsequent global iteration of the decoding process.

2. The communication channel of claim 1, wherein the first quantized sample is only utilized for the first global iteration of the decoding process.

3. The communication channel of claim 1, further comprising:
    a buffer configured for buffering the second quantized sample, wherein the buffered second quantized sample is utilized for all subsequent global iterations of the decoding process.

4. The communication channel of claim 1, wherein the first precision is greater than the second precision.

5. The communication channel of claim 4, wherein sample bit width of the first quantizer is greater than sample bit width of the second quantizer by a predetermined number of bits.

6. The communication channel of claim 1, wherein the iterative decoder implements at least one low density parity check decoder.

7. The communication channel of claim 1, wherein the digital filter includes a digital finite impulse response filter.

8. An iterative detection decoding method, comprising:
    filtering an input signal utilizing a digital filter;
    quantizing the filtered signal utilizing a first quantizer having a first precision to produce a first quantized sample;
    quantizing the filtered signal utilizing a second quantizer having a second precision to produce a second quantized sample, wherein the second precision is different from the first precision;
    utilizing the first quantized sample for a first global iteration of the iterative detection; and
    utilizing the second quantized sample for at least one subsequent global iteration of the iterative detection.

9. The method of claim 8, wherein the first quantized sample is only utilized for the first global iteration of the iterative detection.

10. The method of claim 8, wherein the second quantized sample is buffered and utilized for all subsequent global iterations of the iterative detection.

11. The method of claim 8, wherein the first precision is greater than the second precision.

12. The method of claim 8, wherein the iterative detection decoding method is implemented on a storage device.

13. The method of claim 8, wherein the iterative detection decoding method is implemented on at least one storage device within a redundant array of independent storage devices (RAID) storage system.

14. The communication channel of claim 1, wherein the communication channel is adapted to be implemented on a storage device.

15. The communication channel of claim 14, wherein the storage device includes a hard disk drive.

16. The communication channel of claim 14, wherein the storage device includes a solid state drive.

17. The communication channel of claim 14, wherein the storage device includes a hybrid drive.

18. The communication channel of claim 14, wherein the storage device forms a part of a redundant array of independent storage devices (RAID) storage system.

19. The method of claim 8, wherein the digital filter implements a digital finite impulse response filter.

20. The method of claim 11, wherein sample bit width of the first quantizer is greater than sample bit width of the second quantizer by a predetermined number of bits.

\* \* \* \* \*